(No Model.)
H. P. K. PECK & F. THOMASSEN.
COFFEE TANK.
No. 328,060. Patented Oct. 13, 1885.
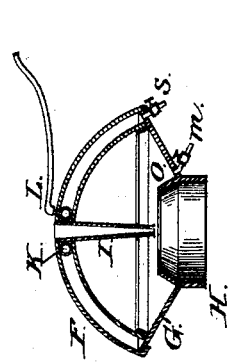
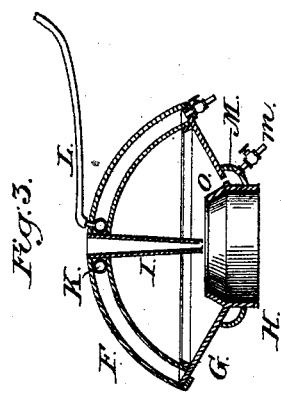
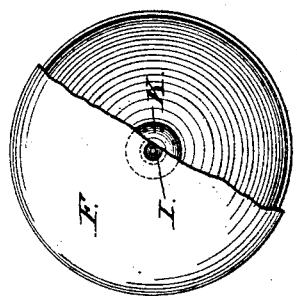
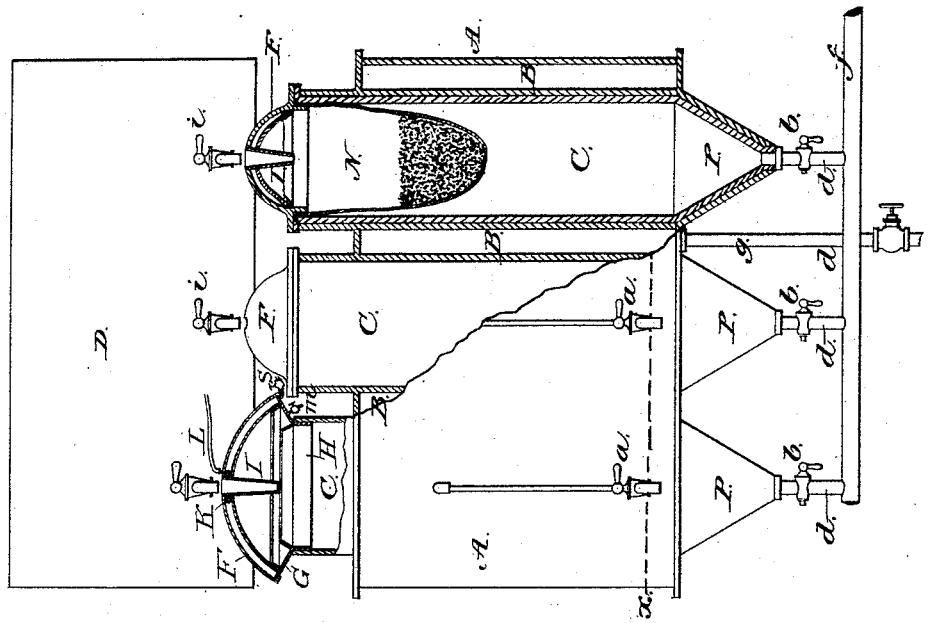
Attest:
John A. Ellis.
W. O. Peck
Inventors:
Homer P. K. Peck
François Thomassen
Atty.

UNITED STATES PATENT OFFICE.

HOMER P. K. PECK AND FRANÇOIS THOMASSEN, OF NEW YORK, N. Y.

COFFEE-TANK.

SPECIFICATION forming part of Letters Patent No. 328,060, dated October 13, 1885.

Application filed June 25, 1884. Serial No. 136,013. (No model.)

*To all whom it may concern:*

Be it known that we, HOMER P. K. PECK and FRANÇOIS THOMASSEN, citizens of the United States, residing at the city, county, and State of New York, have invented a new and useful Improvement in Coffee-Tanks for Preparing Coffee for Table Use, of which the following is a specification, reference being had to the accompanying drawings, forming part thereof.

Figure 1 of the drawings represents a front elevation of the tank with a portion of the outer casing broken away, and exhibits one coffee-receptacle and part of the water tank in vertical section. Figs. 2 and 3 represent vertical central sections of the cover of the coffee-tanks removed. Fig. 4 represents a plan or top view of the cover or double dome, with a portion of the upper dome broken away to exhibit the perforated circular tube.

The objects of our invention are, first, to furnish an apparatus with which coffee can be prepared for table use in connected separate receptacles or tanks arranged in a hot-water tank, so that one or more of the receptacles for the coffee may be used at the same time, and whereby the sediment may be simultaneously discharged from all of the receptacles; second, so that the steam arising from the coffee-liquor shall be condensed and returned with the aroma it contains to either a separate compartment or to the receptacle from whence it arises, as may be desired.

In the drawings, A denotes the main hot-water tank, in which separate cylindrical compartments B are formed, which extend below the tank A, in inverted-cone shape P. The coffee-tanks or receptacles C are of corresponding shape and fit into the compartments B and extend above the water-tank A, as shown in Fig. 1. Tank A is of sufficient capacity to allow the hot water it contains to completely surround the compartments occupied by the several coffee-tanks C. Each coffee-tank is provided with a faucet, $a$, extending outside of water-tank A, for drawing off the liquid coffee for use, and a faucet, $b$, in pipe $d$, which connects with the horizontal pipe $f$, for drawing off the sediment which will gather below the faucets $a$ at dotted line $x$. The pipe $g$ is for supplying steam to the large water-tank A, to keep up a uniform high temperature.

D denotes the supply-reservoir, from which hot water is drawn through faucets $i$ and conveyed through the tapering ingress-pipe I attached to the dome of the cover F, which fits into the open mouth of coffee-tank C.

In Figs. 2, 3, and 4, which represent the enlarged cover for the coffee-tanks C, and which may be used with coffee-boilers of any construction, F denotes a double dome attached to the inclined surrounding annular bottom G, to which the collar H is secured. This collar serves to fit over or within the mouth of a coffee pot or boiler to hold the cover in the usual manner. The collar H extends above the inclined annular bottom G, and inclines inwardly and forms with it a right-angular trough, O, thereby furnishing a receiver for the condensed steam, which will run down the inner surface of the dome and the bottom G.

The tapering tube I, through which the hot water is introduced, extends centrally down to the plane of the upper edge of the flange or trough O, and around its upper end, within the dome, there is a perforated tube, K, provided with a neck over which a flexible hose, L, can be placed for the introduction of cold water.

Surrounding the collar H a circular tube, M, is secured, having communication with the trough O, provided with a faucet, $m$, for drawing off the distilled liquor which is the product of condensation, as described. This distilled coffee may be returned through a suitable pipe directly to the coffee-tank C, below the granulated coffee suspended within a flannel sack, N, from the mouth of the tank or jar.

The faucet S serves to discharge the water from the dome F.

The manner of using our invention for preparing beverages for table use is as follows: Granulated coffee is preferably put into a flannel sack and suspended from the mouth of the coffee-tank, (which should be made of porcelain or similar material,) as shown in Fig. 1, and the hot water from tank D is allowed to flow slowly from faucets $i$ and run through tapering pipe I, and percolate through the granulated coffee and its sack N to tank C, ready to be drawn off by faucet *a* for use. The steam arising from the steeping coffee in sack N, instead of escaping from the ingress-opening of the cover, is prevented by the long pipe I, and will mainly arise and come in contact with the inner cover of dome F, which will be kept constantly cold enough by means of a fine spray of cold water introduced through hose L, and the perforated pipe K, to condense it, and then, as a liquid, it will descend to the trough O as distilled coffee. By these means the aroma usually carried off with the escaping steam arising from boiling or steeping coffee will be retained with the condensed steam to give better flavor to the beverage. It is apparent that the condensation would result from the use of a sponge or felt wet with cold water from time to time and applied to the dome or cover; but the use of the cold-water spray, as described, requires no manipulation in its operation.

The inflowing water from reservoir D must be at a high temperature as well as that within the tank A, which surrounds the several vessels or tanks C.

All the liquid from condensation, as above described, in a series of tanks and domes or covers may be conveyed to a common reservoir or tank placed within the main tank A, to be kept hot and be drawn off for use at pleasure.

Having described our invention, we claim—

1. The double-dome cover F, provided with perforated pipe K, inclined annular bottom G, and trough O, substantially as and for the purpose specified.

2. The enlarged cover constructed, as described, with double dome F, inclined annular bottom G, collar H, trough O, perforated pipe K, tapering elongated tube or funnel I, with ingress and egress passages L M *m*, for the purpose specified.

HOMER P. K. PECK.
FRANÇOIS THOMASSEN.

Witnesses:
O. S. X. PECK,
W. O. PECK.